United States Patent [19]
Breed et al.

[11] Patent Number: 5,197,757
[45] Date of Patent: Mar. 30, 1993

[54] MECHANICAL CRASH SENSOR

[75] Inventors: Allen Breed, Boonton Township, Morris County; Torbjorn Thuen, Morris Plains, both of N.J.

[73] Assignee: Breed Automotive Technology, Inc., Boonton Township, Morris County, N.J.

[21] Appl. No.: 715,493

[22] Filed: Jun. 14, 1991

[51] Int. Cl.⁵ ............................................. B60R 21/32
[52] U.S. Cl. .................................... 280/734; 180/282
[58] Field of Search ................. 280/734, 735; 180/282

[56] References Cited
U.S. PATENT DOCUMENTS

| | | | |
|---|---|---|---|
| 4,573,706 | 3/1986 | Breed | 280/734 |
| 5,005,861 | 4/1991 | Breed et al. | 280/734 |
| 5,031,931 | 7/1991 | Thuen et al. | 280/735 |

Primary Examiner—Kenneth R. Rice
Attorney, Agent, or Firm—Kane, Dalsimer, Sullivan, Kurucz, Levy, Eisele and Richard

[57] ABSTRACT

A mechanical sensor for a passenger restraint system includes several primers are activating a gas generating component, and trigger means for setting the primers off in response to a velocity change. The sensor also includes an inertial mass for sensing the change in velocity. The sensor and the restraint system coact to arm the sensor when the sensor is inserted into the system.

14 Claims, 5 Drawing Sheets

5,197,757

MECHANICAL CRASH SENSOR

RELATED APPLICATIONS

The subject matter of this application is related to application Ser. No. 447,108 filed Dec. 6, 1989, now U.S. Pat. No. 5,031,913, which is a continuation of application Ser. No. 418,228 filed Oct. 6, 1898, entitled A VELOCITY CHANGE SENSOR WITH SCREW ADJUSTMENT, now abandoned.

BACKGROUND OF THE INVENTION

A. Field of Invention

This invention pertains to a sensor used for triggering passenger restraint system in a motor vehicle such an air bag system, and more particularly to a self-contained mechanical sensor with disarming means whereby the sensor can be set off only when it is installed within a passenger restraint system.

B. Description of the Prior Art

Sensors for passenger restraint systems are used to detect passenger restraint systems for detecting a crash. These sensors must be able to discriminate between sudden changes in the velocity of a motor vehicle due to normal operations, and abrupt velocity changes which may result in injury to the passengers. These sensors are often placed in the crush zone of the vehicle because in this zone it is easier to discriminate between acceptable and dangerous velocity changes. However inherently such sensors are less reliable because they must be coupled electrically for mechanically with the rest of the restraint system. Several sensors have been suggested which are made physically integral with the passenger restraint system. In this manner the need for long electrical or mechanical coupling means is eliminated. However, until now, all these systems were complicated to make.

For example U.S. Pat. No. 4,167,276 discloses a sensor relying on a rolamite ball arrangement to sense a crash. The patent also discloses a complicated automatic interlock coupled to the rolamite ball arrangement.

Commonly assigned U.S. Pat. No. 4,666,182 discloses an all mechanical sensor with multiple inertial masses for the sake of redundance.

OBJECTIVES AND SUMMARY OF THE INVENTION

An objective of the present invention is to provide a mechanical sensor which is relatively uncomplicated so that it is easy and inexpensive to make.

A further objective is to provide a sensor with external adjusting means which allows for the adjustment of the sensor sensitivity.

Yet another objective is to provide a small sensor with redundancy to insure a proper operation. Other objectives and advantages of the invention shall become apparent from the following description. A mechanical sensor constructed in accordance with this invention includes a housing with an inertial mass movable along a path in response to a change of velocity. The mass reaches a preselected point along its path, it triggers a mechanically loaded mechanism which in turn sets of a primer. The primer in turn is used to ignite a gas generator means. The sensor includes arming means for arming the inertial mass only when the mass is in position within a passenger restraint system.

DETAILED DESCRIPTION OF THE INVENTION

Figure 2:
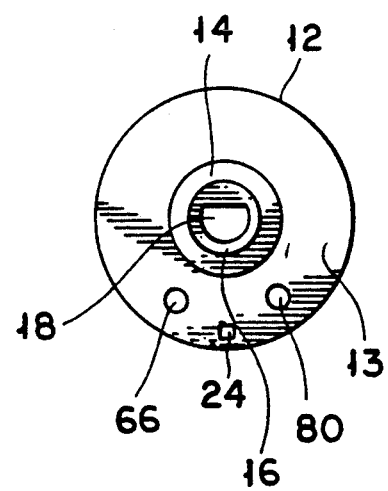
FIG. 2 shows an end view of the sensor of FIG. 1.
Figure 3:
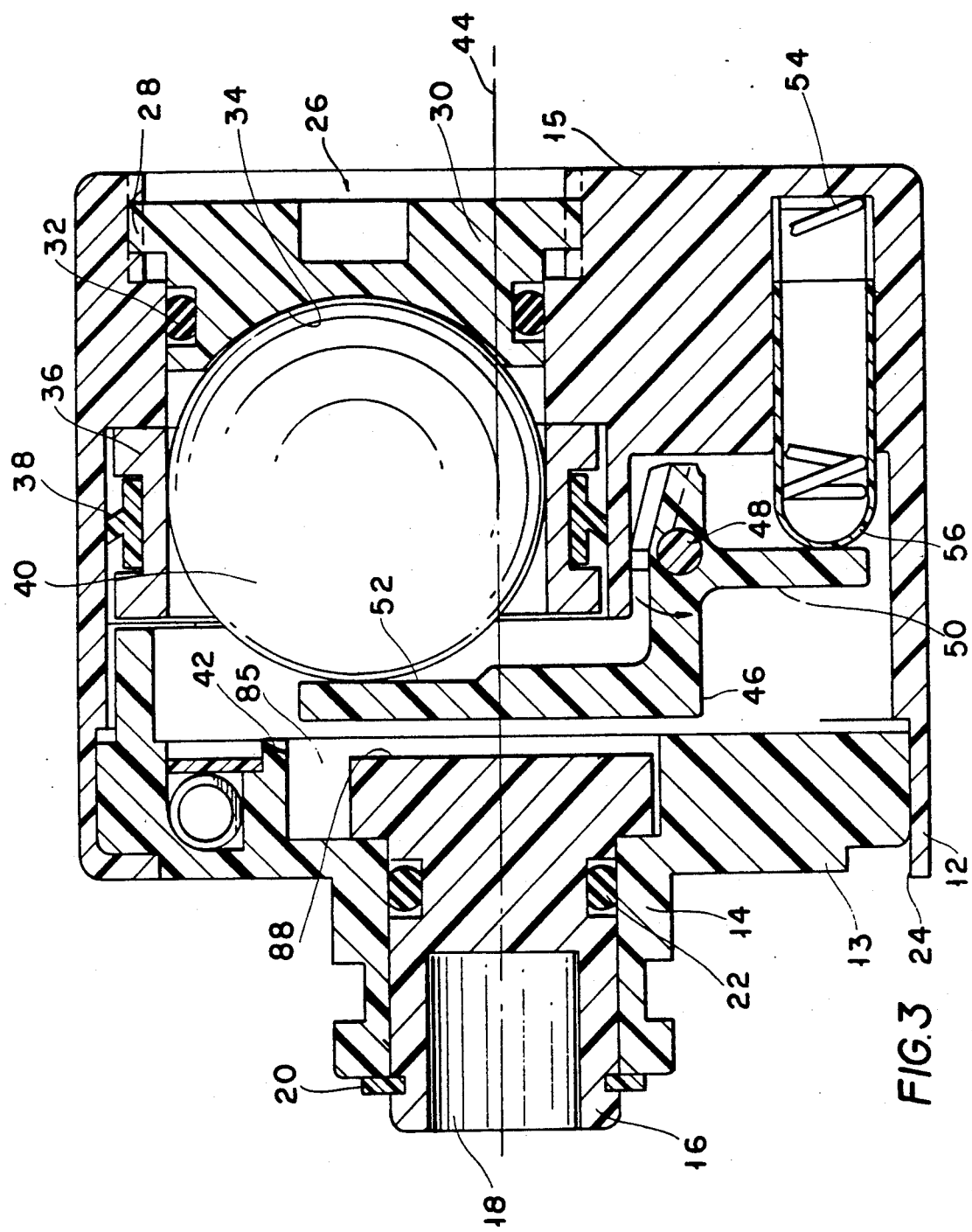
FIG. 3 shows a side sectional view taken along line 3—3 in FIG. 2.

Referring now to the Figures, a sensor 10 constructed in accordance with this invention includes a generally tubular wall 12 terminated with a cap 13. Cap 13 has an extension 14 at one end. The other end 15 of the wall 12 is closed. Extension 14 rotatable holds a cylindrical insert 16 having a D-shaped hole 18. Insert 16 is captured by a C-shaped washer 20 (shown in FIG. 3). An O-ring 22 is disposed inside extension 14 to seal the interior of the sensor 10. A portion of the cap 13 is indented to define with wall 12 a finger 24 as seen in FIGS. 2 and 3.

Inside sensor 10, is a tubular space 26 is formed with internal threads 28 extending from end 15. A threaded screw 30 is disposed in space 26 at the end adjacent to wall end 15. An O-ring 32 seals the space 26 from ambient atmosphere. The screw 30 has an internal spherical wall 34. Also in space 26 is a metallic sleeve 36. The sleeve 36 is floating with respect to wall 12 and is maintained in position by a resilient ring 38. Within sleeve 36 there is an inertial mass in the form of a ball 40. Ball 40 is biased against surface 34 as described below. The diameter of the ball is substantially equal to the diameter of sleeve 36 so that as the ball moves through the seal, its motion is damped by the air within the sleeve. Opposite to surface 34, cap 13 is formed a spherical surface as at 42 to form a stop for ball 40. Thus a linear path is formed for ball 40 from surface 34 to surface 42. This path is parallel with, but offset from the longitudinal axis 44 or sensor 10.

A lever 46 is mounted on a shaft 48 inside the sensor 10. The lever has two opposed arms 50, 52. Mounted on end 15 there is a toroidal compressing spring 54 with a cap 56. Cap 56 is pushed by spring 54 to urge arm 50 to the left, as seen in FIG. 3. As a result of this biasing force, opposite arm 54 pushes ball 40 to the right, against wall 34, as shown in FIG. 3.

Figure 4:
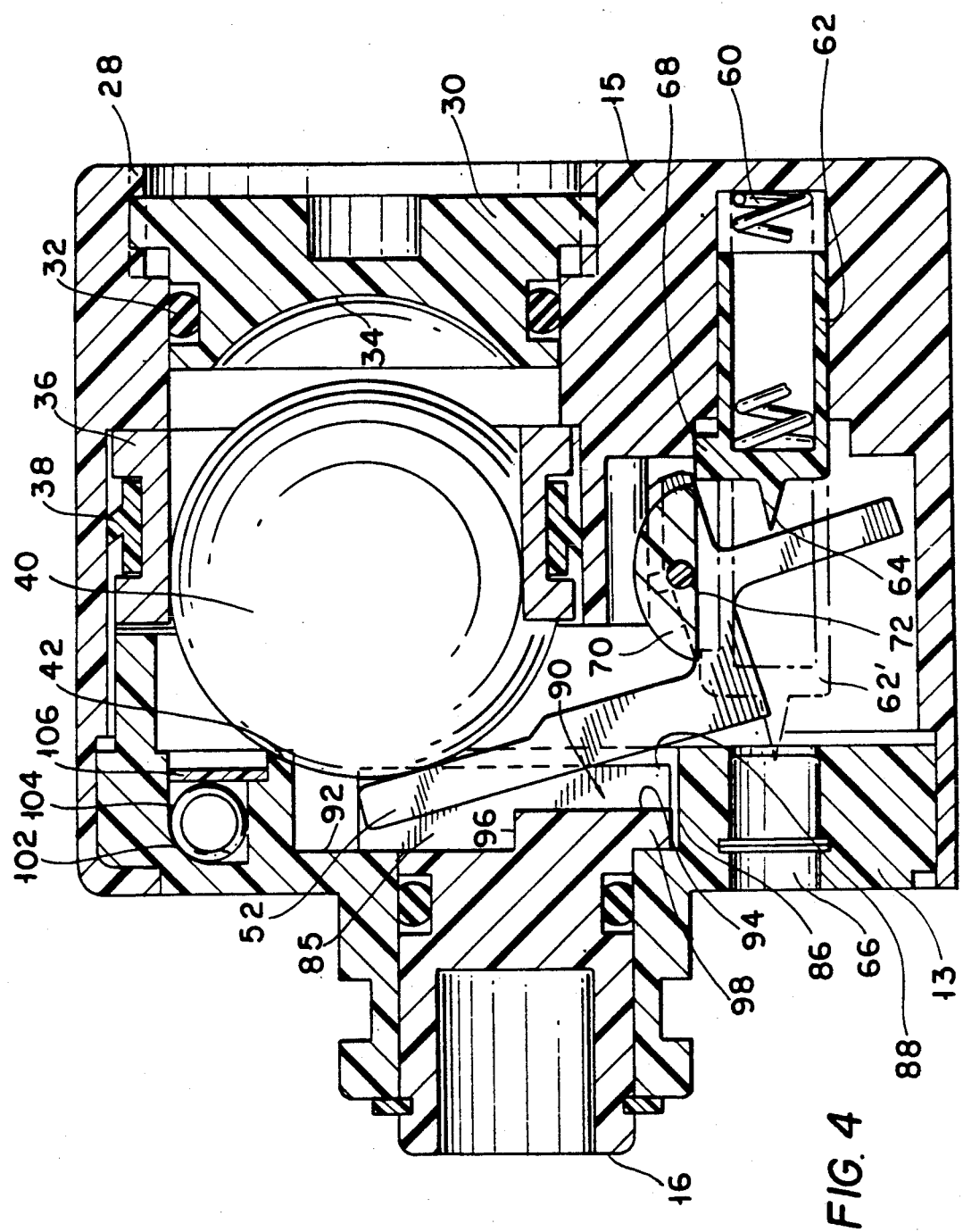
FIG. 4 shows a side sectional view taken along line 4—4 in FIG. 2.

As shown in FIG. 4, also mounted on end 15, there is another compression spring 60 terminating in a cap 62 with a spike 64. Opposite cap 62, cap 13 holds a primer charge 66. Cap 62 has a flange. Importantly, adjacent to cap 62, shaft 48 is formed with a D-shaped disk 70 with a flat surface 72.

The sensor is provided with another compression spring (not shown) terminated in a cap 74, D-shaped disk 76 and primer charge 80 on the other side of lever 46. The ends of shaft 48 are mounted in journals 82, 84 which allow the shaft 48 to pivot. As a result, when the sensor is armed, arm 52 may pivot from a first position shown in FIG. 3 wherein it pushes ball 40 against wall 34 to a second position shown in FIG. 4 wherein ball 40 is in contact with wall 42. In this second position, arm 52 is disposed in a cavity 85 formed in cap 13 as follows.

Figure 5:
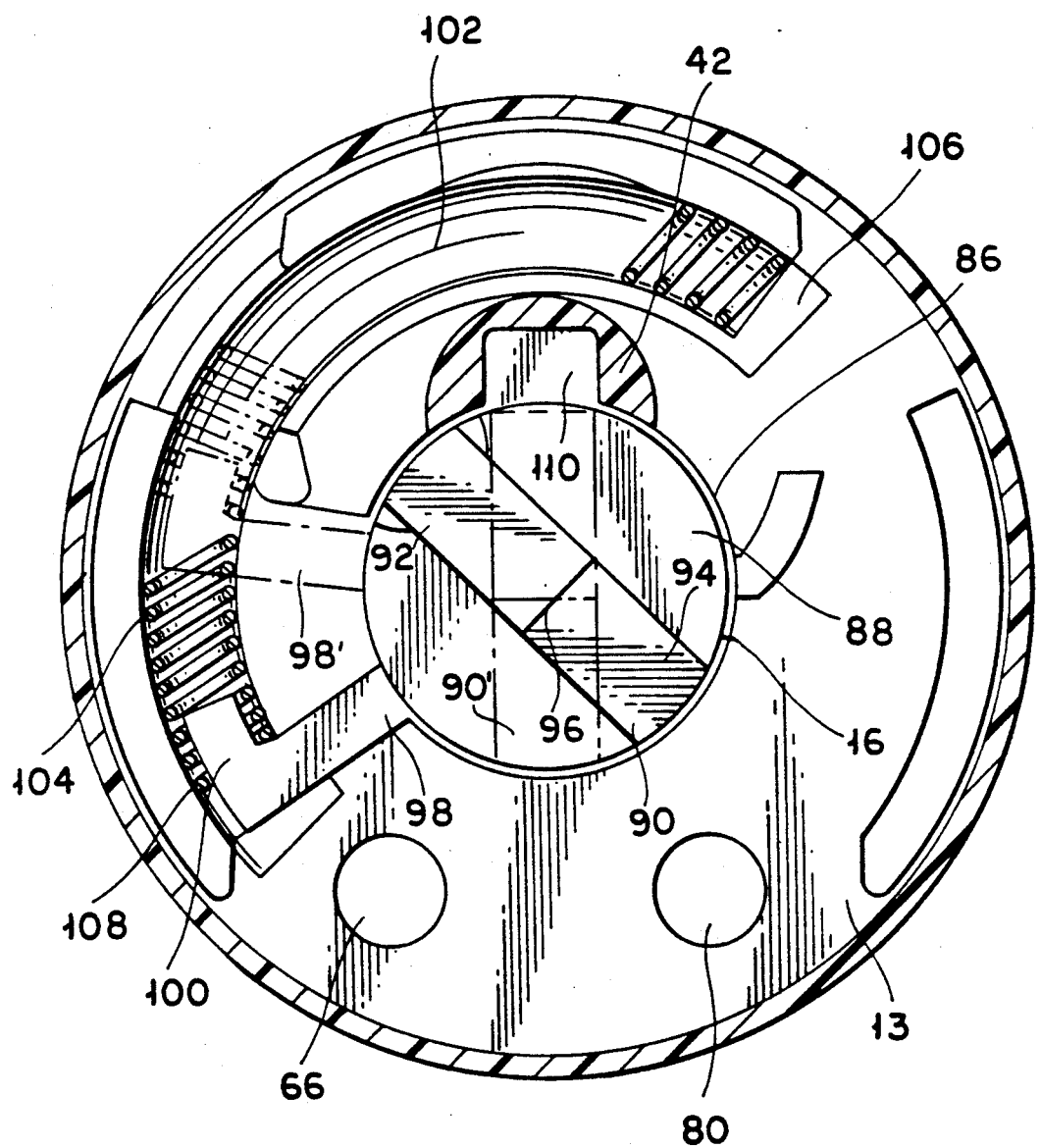
FIG. 5 shows a cross-sectional view taken along line 5—5 in FIG. 1.
Figure 6:
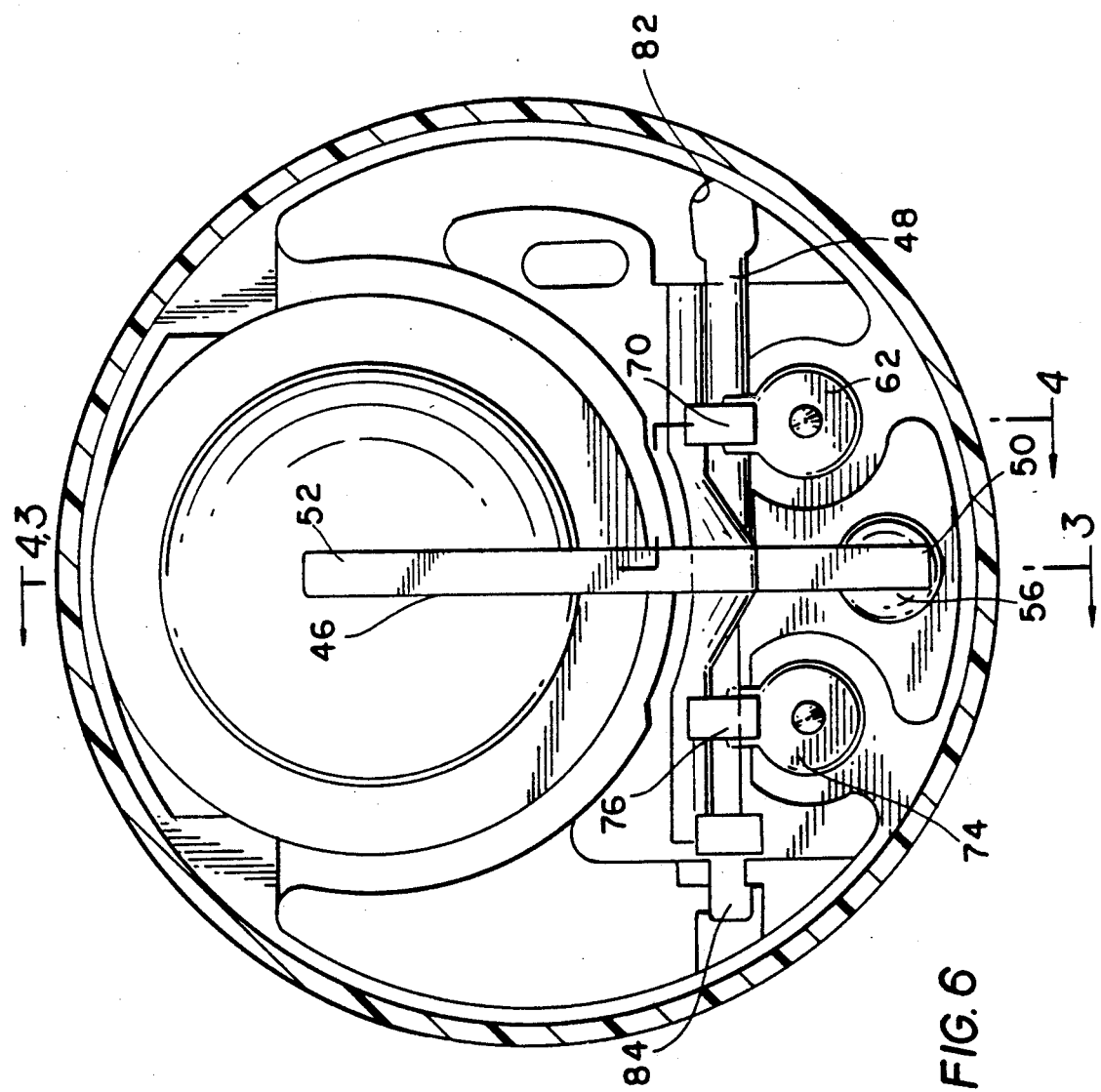
FIG. 6 shows a cross-sectional view taken along line 6—6 in FIG. 1.

As shown in FIG. 5, cap 13 is provided with a central hole 86 for holding insert 16. The bottom surface 88 of insert 16 is provided with a rectangular cut 90 having a width slightly greater than the width of lever arm 46. Preferably, as seen, in FIG. 5, cut 90 has two levels 92, 94 separated by a wall 96. Insert 16 is also provided with an extension 98 extending radially and terminating in a tangential arm 100. Cap 13 also has a arcuate cut 102 holding a compression coil spring 104. Spring 104 is held in cut 102 by a plate 106. One end 108 of spring 104 is in contact with arm 100 of extension 98 as shown. Cap 13 is also formed with a cut 110 having a width equal to the width of cut 90. Cut 90 is made so that it extends through surface 42.

As previously mentioned, insert 16 is rotatable within cap 13. When the sensor is not installed in place, spring 104 pushes extension 98 clockwise to the position shown in FIG. 5. In this position cut 92 is angularly displaced from cut 110. As a result, as shown in FIG. 3, surface 88 acts as a stop which does not permit arm 52 to move into cavity 85. Thus even if the sensor 10 is accidentally activated, for example by dropping it, or hitting it with a hammer, the sensor will not go off, as explained more fully below.

Figure 1:
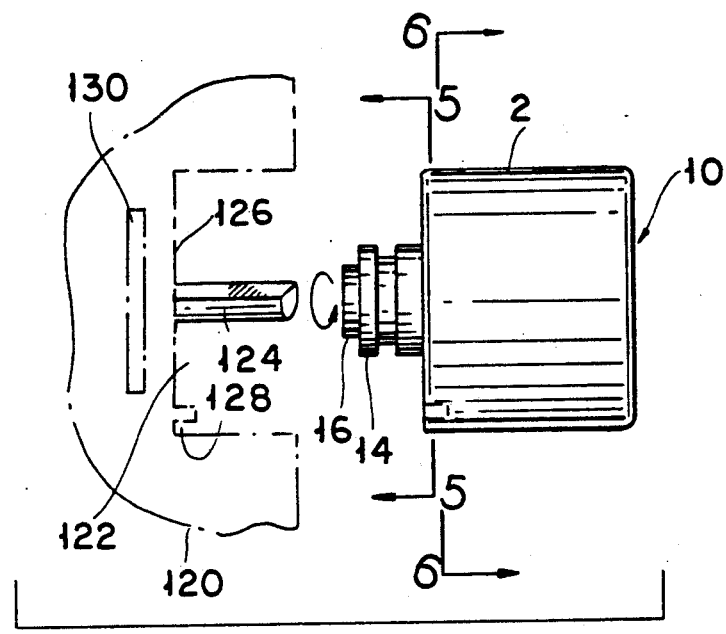
FIG. 1 shows a side view of a sensor constructed in accordance with this invention, as it is being installed in a passenger restraint system.

Once the sensor is assembled, it is ready to be installed in a passenger restraint system. This system 120, a partial view of which is shown in FIG. 1, includes a cavity 122 constructed and arranged to hold sensor 10. More specifically, cavity 122 includes a rod 124 extending from the floor 126. Rod 124 has a D-shaped cross-section for matching the hole 18 in insert 16. On one side, cavity 122 is also provided with a hole 128 to hold finger 24 (shown in FIG. 3). Thus hole 128 and finger 24 cooperate to form a detent or indexing means for the sensor. Sensor 10 is installed by first positioning and mounting it over shaft 124. In this position, the sensor is still unarmed, i.e. arm 98 is in position shown in solid lines in FIG. 5. In this position, the finger 24 is not aligned with hole 128 and therefore the sensor cannot be seated into cavity 120. In order to complete the installation, the sensor is turned to bring the finger 24 in alignment with hole 128 and then the sensor is pushed in so that it is fully seated. Importantly, while the sensor 10 is rotated with respect to the fixed shaft 124, since the shaft 124 is coupled to insert 16, the insert also remains fixed. As a result, the sensor together with the cap 13 rotates with respect to the insert 16 until arm 98 reaches the position 98' shown in dotted lines in FIG. 5. In this position, cut 90 is also rotated to position 90' in which it is aligned with cut 110. Therefore once the sensor is seated within the passenger restraint system 120, cut 92 is shifted angularly to complete cavity 85. In this configuration, the lever is free to move fully to the second position shown in FIG. 4. In this position the sensor is fully armed.

Once the sensor 10 is installed and armed as described above, it is ready for operation. During normal operation of the motor vehicle, ball 40 is biased against wall 34 by lever 50. In this position, the D-shaped disks 70, 76 keep the caps 62 and 74 in the position shown in FIG. 4. When the vehicle is involved in a crash resulting a large velocity change, the ball 40 is subjected to a force large enough to overcome the biasing the spring 54. The exact speed change at which the ball starts moving may be adjusted by changing the position of screw 30. In response to this force, ball 40 moves from the first position shown in FIG. 3 to the second position shown in FIG. 4 and pivots lever 50 counterclockwise. As a result of this pivoting motion, the D-shaped disks 70, 76 rotate in a position which allow the caps 62, 74 to move towards cap 13. Because of the force generated by spring 60 (and the spring not shown but coupled to cap 74) caps 62, 74 then hit the primer capsules 66, 80. As a result the primer capsules are set off and ignite the gas generator compound 130 in the passenger restraint system.

Obviously numerous modifications may be made to this invention without departing from its scope as defined in the appended claims.

We claim:
1. A crash sensor for a passenger restraint system comprising:
 a tubular body open at one end and defining a path of movement between a first position and a second position;
 cap means for closing said one end;
 an inertial mass disposed in said path;
 biasing means for biasing said inertial mass, said inertial mass moving to said second position in response to an acceleration by overcoming said biasing means;
 priming means disposed on said cap and including a first and second primer; and
 triggering means disposed in said body and including a triggering device in contact with said inertial mass at least in said second position and arranged for triggering said first and second primers when said inertial mass is in said second position.

2. The crash sensor of claim 1 further comprising arming means disposed in said cap for arming said sensor.

3. The crash sensor of claim 2 wherein said arming means cooperates with said passenger restraint system to arm said sensor when said sensor is installed.

4. The crash sensor of claim 1 wherein said triggering device includes a movable lever, and biasing means for biasing said lever against said inertial mass.

5. The crash sensor of claim 4 wherein said lever and biasing means cooperate to urge said inertial mass toward said first position.

6. A passenger restraint system comprising:
 gas generator means;
 cavity means for defining a cavity disposed near said gas generator means;
 a sensor disposed in said cavity and including a tubular housing with an open end; an inertial mass disposed in said housing and movable between a first and a second position; biasing means disposed in said housing for biasing said inertial mass toward said first position; a trigger device activated by said inertial mass when said inertial mass is in said second position; priming means for activating said gas generator means, said priming means including a first primer and a second primer, each said primers being independently triggered by said trigger device when said inertial mass is in said second position; and an end cap for closing said open end, said end cap including arming means for arming said sensor, said arming means including blocking means for blocking said priming means; and
 coupling means for deactivating said blocking means when said sensor is disposed in said cavity.

7. The system of claim 6 wherein said coupling means comprises indexing means for allowing said sensor to be inserted into said cavity when said sensor is in a predetermined position, and deactivating means extending into said sensor for deactivating said blocking means.

8. The system of claim 7 wherein said end cap includes a rotatable insert, said deactivating means engaging said insert when said sensor is inserted into said cavity.

9. The system of claim 6 wherein said biasing means comprises a biasing spring and said trigger device includes a pivotable lever having a first and a second arm, said first arm being in contact with said inertial mass and said second arm being coupled to said biasing spring for urging said inertial mass toward said first position.

10. A passenger restraint system comprising:
gas generator means;
cavity forming means for forming a cavity;
a crash sensor for sensing a crash when disposed in said cavity, said crash sensor including:
a housing defining an internal path between a first position and a second position and including a rotatable insert;
an inertial mass disposed for movement along said path;
a spring for biasing said inertial mass toward said first position; and
primer means for activating said gas generator means; and
arming means for arming said primer means when said crash sensor is disposed in said cavity in a preselected position, wherein said arming means comprises indexing means for allowing said sensor to be inserted into said cavity when said sensor is in a predetermined position, blocking means for blocking said primers and deactivating means extending into said sensor for deactivating said blocking means, said deactivating means engaging said insert when said sensor is inserted into said cavity.

11. The system of claim 10 wherein said primer means comprises a plurality of capsules disposed on said housing and an equal plurality of trigger means disposed in said housing for triggering said capsules when said inertial mass is in said second position.

12. The system of claim 11 wherein each said trigger means comprises spring biased cap maintained in a first position by said shaft, said cap moving toward one of said capsules when said inertial mass is in said second position.

13. The system of claim 10 wherein said blocking means is movable between a first and a second position, said blocking means blocking said priming means in said first position, and wherein said arming means includes a rod disposed on said cavity forming means, said rod extending into said housing for moving said blocking means, and detect means for defining a position for said sensor within said cavity, in which sensor is armed.

14. The system of claim 13 wherein said blocking means is rotated to said second position by said rod when said sensor is coupled to said rod and rotated to match said detent means.

* * * * *